United States Patent
Chun

(10) Patent No.: US 12,453,567 B2
(45) Date of Patent: Oct. 28, 2025

(54) STONE REMOVING APPARATUS AND STONE SIZE MEASURING METHOD

(71) Applicant: ROEN SURGICAL, INC., Daejeon (KR)

(72) Inventor: Byung Sik Chun, Daejeon (KR)

(73) Assignee: ROEN SURGICAL, INC., Daejeon (KR)

( * ) Notice: Subject to any disclaimer, the term of this patent is extended or adjusted under 35 U.S.C. 154(b) by 0 days.

(21) Appl. No.: 17/397,897

(22) Filed: Aug. 9, 2021

(65) Prior Publication Data

US 2023/0039326 A1 Feb. 9, 2023
US 2025/0000533 A9 Jan. 2, 2025

Related U.S. Application Data

(63) Continuation of application No. PCT/KR2020/095133, filed on Oct. 30, 2020.

(30) Foreign Application Priority Data

Nov. 28, 2019 (KR) .......................... 10-2019-0155961

(51) Int. Cl.
*A61B 17/221* (2006.01)
(52) U.S. Cl.
CPC .... *A61B 17/221* (2013.01); *A61B 2017/2215* (2013.01)
(58) Field of Classification Search
CPC ............ A61B 17/221; A61B 17/00234; A61B 1/00006; A61B 1/00045; A61B 1/307;
(Continued)

(56) References Cited

U.S. PATENT DOCUMENTS 6,569,084 B1 * 5/2003 Mizuno ................ A61B 1/0051
600/102
8,523,879 B1 * 9/2013 Lind .................... A61B 17/221
606/127

(Continued)

FOREIGN PATENT DOCUMENTS

JP 2006-511296 A 4/2006
JP 2016515464 A 5/2016
(Continued)

OTHER PUBLICATIONS

Decision on Registration dated Jan. 7, 2022, issued in corresponding Korean Patent Application No. 10-2019-0155961.
(Continued)

*Primary Examiner* — Dianne Dornbusch
(74) *Attorney, Agent, or Firm* — Morgan, Lewis & Bockius LLP

(57) ABSTRACT

Disclosed herein is a stone removing apparatus and a stone size measuring method, which can take a picture of a stone and measure the size of the stone in order to stably remove the stone without damaging a human body. The stone removing apparatus includes: an insertion tube having an inner space; a guide tube inserted into the inner space of the insertion tube to be moved; a wire inserted into the guide tube to be movable; a basket disposed at the front of the wire to grasp a stone; an imaging unit disposed at the front end of the guide tube in order to take an image of a stone grasped by the basket; and a control unit electrically connected with the imaging part to analyze the image taken by the imaging unit, wherein the control unit calculates a distance between the imaging unit and the basket to measure the actual size of the stone using the calculated distance.

19 Claims, 6 Drawing Sheets

(58) Field of Classification Search
CPC ... A61B 1/00009; A61B 1/0005; A61B 1/018; A61B 1/05; A61B 2017/00022; A61B 2017/00199; A61B 2017/2215; A61B 34/20; A61B 2017/2212; A61B 2017/2217; G06T 7/0012; G06T 7/62; G06T 2207/10068; G06T 2207/30084
See application file for complete search history.

(56) References Cited

U.S. PATENT DOCUMENTS

| | | | | |
|---|---|---|---|---|
| 2009/0082780 | A1* | 3/2009 | Lu | A61B 17/221 |
| | | | | 606/127 |
| 2011/0015648 | A1* | 1/2011 | Alvarez | A61B 34/76 |
| | | | | 606/130 |
| 2015/0313444 | A1* | 11/2015 | Wolf | A61B 17/22004 |
| | | | | 600/103 |
| 2015/0366571 | A1* | 12/2015 | Navve | A61B 5/201 |
| | | | | 606/128 |
| 2017/0020541 | A1* | 1/2017 | Mahajan | A61B 90/03 |
| 2017/0119411 | A1* | 5/2017 | Shah | A61B 17/32002 |
| 2017/0296266 | A1 | 10/2017 | Salahieh et al. | |
| 2017/0319222 | A1* | 11/2017 | Chu | A61B 17/00234 |
| 2018/0177561 | A1* | 6/2018 | Mintz | A61B 34/30 |
| 2018/0192982 | A1* | 7/2018 | Pereira | A61B 8/12 |
| 2019/0175009 | A1* | 6/2019 | Mintz | A61B 34/30 |
| 2020/0375682 | A1* | 12/2020 | Kincaid | A61B 34/20 |
| 2021/0085165 | A1* | 3/2021 | Rauniyar | G06T 5/001 |
| 2021/0369384 | A1* | 12/2021 | Lin | A61B 90/06 |
| 2021/0404796 | A1* | 12/2021 | Stoianovici | A61B 1/307 |

FOREIGN PATENT DOCUMENTS

| | | | |
|---|---|---|---|
| KR | 101782250 B1 | 9/2017 | |
| KR | 20190119542 A | 10/2019 | |
| WO | WO-2019046237 A1 * | 3/2019 | ......... A61B 1/00004 |

OTHER PUBLICATIONS

International Search Report dated Jun. 8, 2021 issued in corresponding International Patent Application No. PCT/KR2020/095133.

* cited by examiner

STONE REMOVING APPARATUS AND STONE SIZE MEASURING METHOD

BACKGROUND OF THE INVENTION

Field of the Invention

The present invention relates to a stone removing apparatus and a stone size measuring method, and more particularly, to a stone removing apparatus and a stone size measuring method, which can take a picture of a stone and measure the size of the stone in order to stably remove the stone without damaging a human body.

Background Art

In general, a stone existing in a human body is that organic ions are deposited by a change of solubility according to a change in pH, and is divided into a urinary stone and a bile duct stone (gallstone) according to a part where a stone is formed. When such a stone is formed, it causes an obstacle of a normal flow and induces a symptom. There are various ways to remove such a stone, but the stone is generally removed by an electrohydraulic lithotripsy device having an endoscope, a basket catheter, and a lithotripsy probe.

For instance, gallstone removal after performing papillary sphincterotomy and devices used for removing a gallstone will be described.

About 90% of gallstones with diameter not exceeding 10 mm can be removed by papillary sphincterotomy, which has been used conventionally, and by a method of removing a gallstone using a basket or a balloon.

However, a gallstone with diameter exceeding 10 mm cannot be removed by the above methods but can be removed after lithotripsy of the gallstone. The lithotripsy is largely divided into mechanical lithotripsy and electrohydraulic lithotripsy. Especially, after papillary incision, the gallstone with diameter not exceeding 10 mm can be collected by the basket catheter, but the gallstone with diameter of 10 mm to 20 mm can be removed using lithotripsy and the basket catheter directly after incision. However, in case of a kidney stone, it is removed by extracorporeal shock wave lithotripsy (ESWL).

FIG. 1 is a perspective view of a conventional basket catheter used to remove a gallstone.

Referring to FIG. 1, the basket catheter 200 used to remove the gallstone includes a tube 240, wires 250 which has twisted metal wires of four strands fixed to the front end of the wire and is inserted into an inner space of the tube 240, and a basket 220 to which ends of the wires 250 curved are fixed. In case of an operation to remove the gallstone, the front end of the tube 240 is inserted into the position where the gallstone is located, and then, the basket 220 is opened so that the gallstone is caught into the basket 220. In order to remove the gallstone, the basket 220 is pulled into the tube 240, and the gallstone is tightened and fixed to the basket 220 and is taken out.

However, the removal of the gallstone using the basket catheter has a limitation according to the size and the location of the gallstone. In fact, if the long diameter of the gallstone exceeds 10 mm, it is difficult to remove the gallstone. Moreover, a big gallstone of which the long diameter exceeds 20 mm is difficult to be removed even though papillary sphincterotomy is performed.

The stone removal using the basket is used not only for removing gallstones but also for removing kidney stones through the ureter. Furthermore, if the outer diameter is uneven even though a stone is not big, it may cause a serious damage to the human body since a sharp part of the stone scratches and cuts the inside of the ureter when a doctor grasps and takes out the stone using the basket.

Additionally, if the stone does not have a spherical shape but has a complex protrusion shape, in case that the maximum size of protrusions is not measured exactly, when the stone larger than the ureter is taken out through the ureter, the protrusions scratch the inside of the ureter and it causes a lot of pain.

Therefore, in order to remove a stone using the basket, it is required to exactly measure the maximum size of the stone, determine whether the maximum size of the stone is larger than the diameter of the ureter, and remove the stone through the ureter only when the maximum size of the stone is smaller than the diameter of the ureter.

PATENT LITERATURE

Patent Documents

Patent Document 1: Korean Patent No. 10-1782250

SUMMARY OF THE INVENTION

Accordingly, the present invention has been made to solve the above-mentioned problems occurring in the prior arts, and it is an object of the present invention to provide a stone removing apparatus and a stone size measuring method, which can grasp a stone with a basket, take images of the whole outward appearance of the stone while a camera goes around the stone in order to exactly grasp the size and flexuosity of the stone and remove the stone, thereby enhancing productivity and maximizing reliability by safely removing the stone without damaging the ureter.

To accomplish the above object, according to the present invention, there is provided a stone removing apparatus including: an insertion tube having an inner space; a guide tube inserted into the inner space of the insertion tube to be moved; a wire inserted into the guide tube to be movable; a basket disposed at the front of the wire to grasp a stone; an imaging unit disposed at the front end of the guide tube in order to take an image of a stone grasped by the basket; and a control unit electrically connected with the imaging part to analyze the image taken by the imaging unit, wherein the control unit calculates a distance between the imaging unit and the basket to measure the actual size of the stone using the calculated distance.

Moreover, the stone removing apparatus further includes a display unit linked with the control unit by wire or wirelessly to display the contents analyzed by the control unit.

Furthermore, the imaging unit takes an image of the outer circumference shape of the stone in a state where the basket grasping the stone is fixed or rotated.

Additionally, the control unit sets a point of the outer circumference of the stone which is the farthest from the center, based on the image, and calculates the actual size of the stone using a distance from the point to the outer contour point which is the farthest from the point.

In addition, the imaging unit takes an image of the shape of the stone grasped by the basket, and the control unit measures a distance between the imaging unit and the center of the basket grasping the stone in order to determine the actual size of the stone.

Moreover, an auxiliary imaging object is attached to the front surface of the basket grasping the stone and the imaging unit takes an image of the auxiliary imaging object in order to calculate the distance between the imaging unit and the basket using the stone size displayed on the image of the auxiliary imaging object.

Furthermore, the stone removing apparatus further includes a distance measuring unit mounted at the rear end portion of the wire to measure a relative movement distance between the imaging unit and the wire.

Additionally, the distance between the imaging unit and the basket is determined when the distance measuring unit measures the distance from the rear end portion of the wire to the rear end of the guide tube.

In addition, the stone removing apparatus further includes a sheath which surrounds the outside of the insertion tube and is mounted in the ureter to move the insertion tube.

In another aspect of the present invention, there is provided a stone size measuring method includes the steps of: moving a guide tube into the ureter and grasping a stone by a basket; taking an image of the outer circumference shape of the stone by an imaging unit while stopping or rotating the basket grasping the stone; transferring the image taken by the imaging unit to a control unit, analyzing the image to calculate a distance between the imaging unit and the basket, and calculating the actual size of the stone using the calculated result; and displaying data of the actual size of the stone analyzed by the control unit on a display unit.

Moreover, the stone size measuring method further includes the steps of setting a point of the outer circumference which is the farthest from the center on the basis of the image taken by the control unit, and calculating the actual size of the stone using the distance between the point and the outer contour point which is the farthest from the point.

The stone removing apparatus and the stone size measuring method according to the present invention can directly remove a stone if the stone is smaller than the ureter of a human body and can remove the stone after crushing the stone if the stone is bigger than the ureter since the imaging unit takes images of the whole outward appearance of the stone grasped by the basket to measure the size and the outward form of the stone, thereby providing convenience in operation and providing a patient with reliability through safe operation without damaging the patient's body.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Example embodiments of the present invention are capable of various modifications and alternative forms, and particular embodiments of the present invention will be illustrated in the attached drawings and described in this specification in detail. It should be understood, however, that there is no intent to limit example embodiments of the invention to the particular forms disclosed, but on the contrary, example embodiments of the invention are to cover all modifications, equivalents, and alternatives falling within the technical idea and scope of the present invention.

In the attached drawings, the embodiments of the present invention are not limited to specific forms but are more exaggerated than they actually are in order to clarify the present invention. In this specification, specific terms are used, but the terms are used to explain the particular embodiment only and it is a not an intention to limit the meanings or the scope of the present invention described in claims.

In the present specification, the term "and/or" is understood to include at least one of the constituent elements that are enumerated in the context. Additionally, the terms of "connected" or "coupled" may be referred to as being directly connected or coupled to another element or indirectly connected or coupled via another element. In addition, a singular form also includes a plural form unless particularly stated otherwise in the present specification. In addition, the word "comprises" and/or "comprising" used in the present specification will be understood to imply the inclusion of stated constituents, steps, operations, and elements but not the exclusion of one or more other constituents, steps, operations, elements, and devices.

Moreover, terms, such as "first" or "second", may be used to discriminate one component from another component, and do not limit the order or specific characteristics of the components or elements.

In description of preferred embodiments of the present invention, that a layer, a film, an area, a pattern or a structure is formed "on" or "under" a substrate, a layer, a film, a pad or a pattern means that the layer, the film, the area, the pattern or the structure is directly formed or indirectly formed via an intervening layer. The conception of "on" or "under" of a layer will be described based on the drawings.

Hereinafter, preferred embodiments of the present invention are described in detail with reference to the accompanying drawings.

Figure 1:
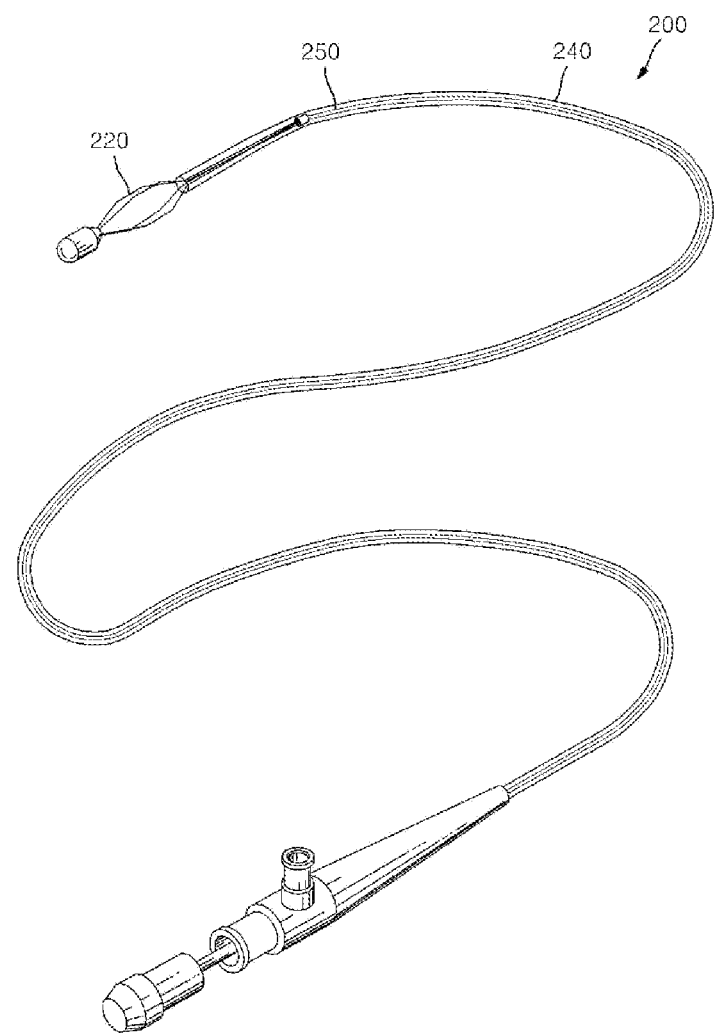
FIG. 1 is a perspective view of a conventional basket catheter used to remove a gallstone.
Figure 2:
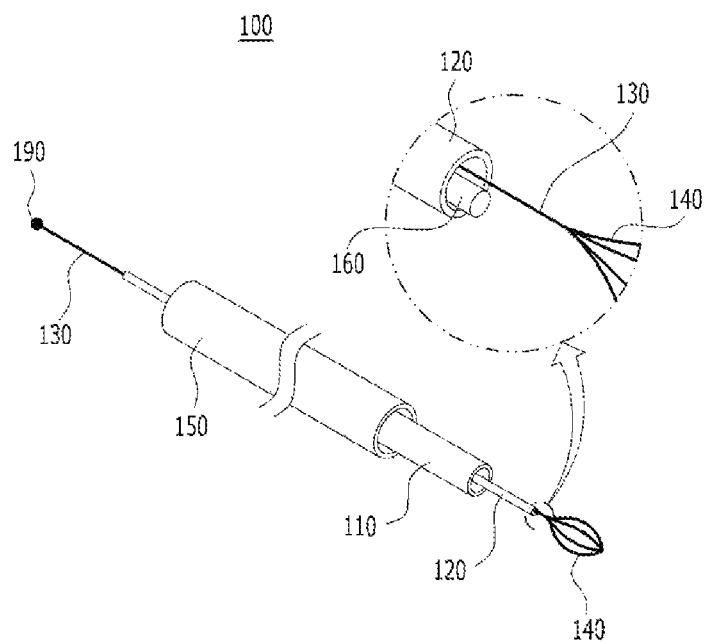
FIG. 2 is a perspective view showing a stone removing apparatus according to a preferred embodiment of the present invention.
Figure 3:
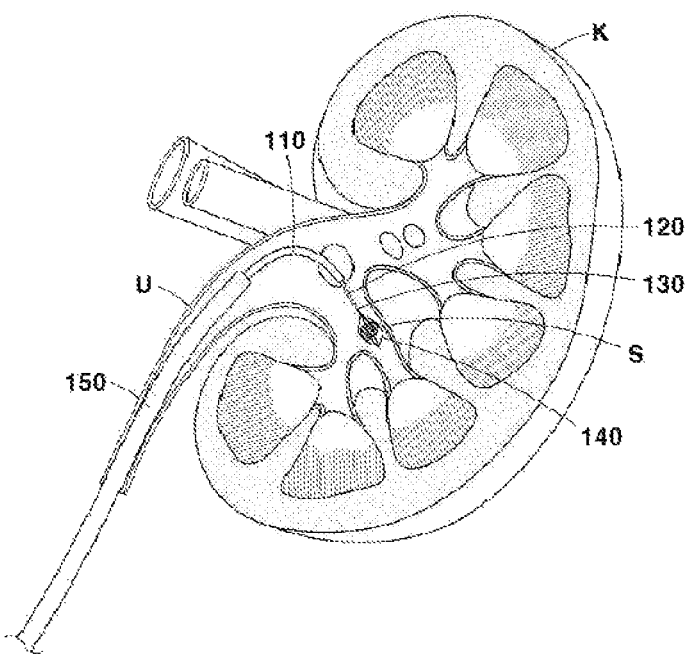
FIG. 3 is a schematic diagram showing a state where the stone removing apparatus according to the preferred embodiment of the present invention removes a stone in a patient's body.
Figure 4:
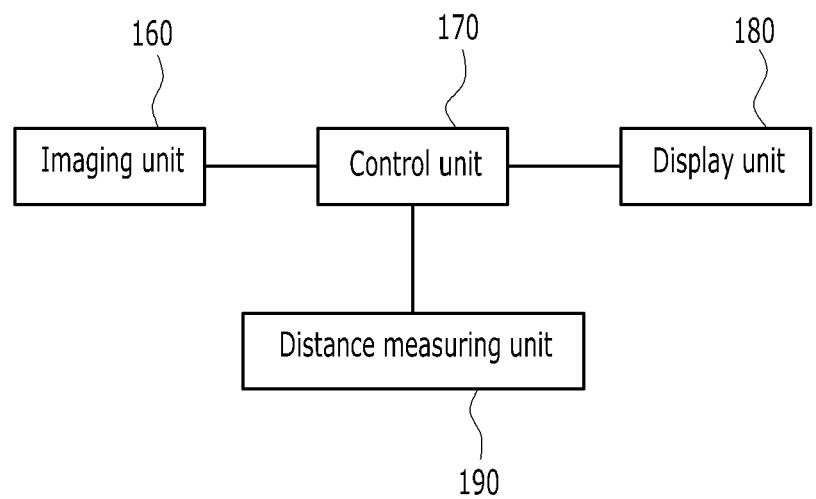
FIG. 4 is a block diagram showing the stone removing apparatus according to the preferred embodiment of the present invention.
Figure 5:
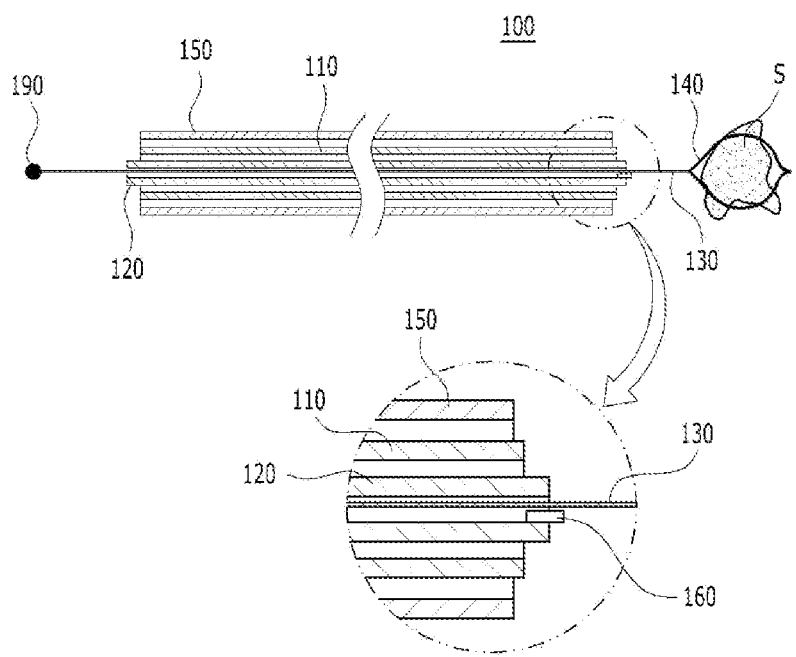
FIG. 5 is a sectional view showing the stone removing apparatus according to the preferred embodiment of the present invention.
Figure 6:
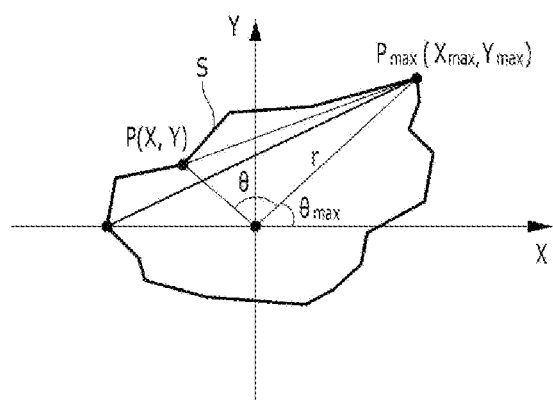
FIG. 6 is an exemplary view showing an example of the stone removing apparatus according to the preferred embodiment of the present invention and illustrating an estimated size of a substantive stone based on an image taken by an imaging unit.
Figure 7:
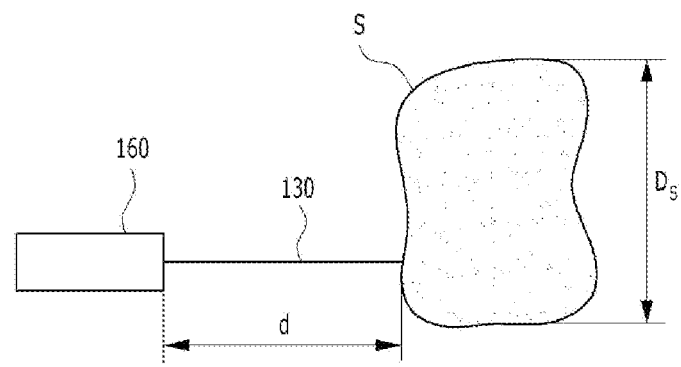
FIG. 7 is a mimetic diagram showing an arrangement of the imaging unit of the stone removing apparatus and a stone.
Figure 8:
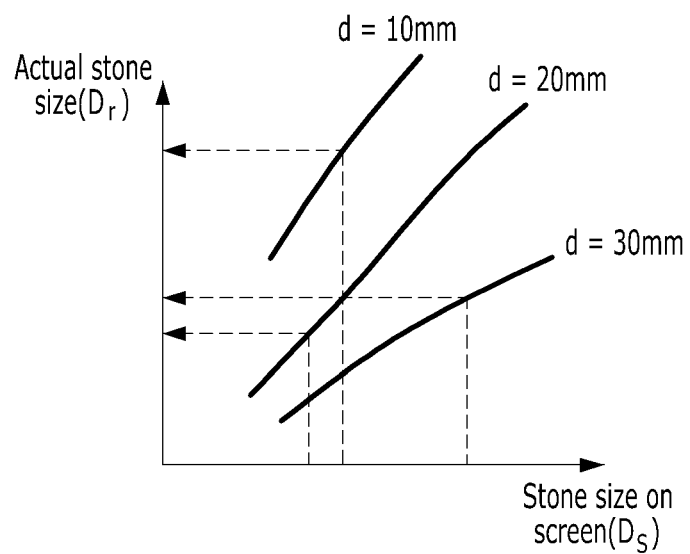
FIG. 8 is a graph to determine a size of an actual stone using the size of the stone on the image taken by the imaging unit of the stone removing apparatus of FIG. 7.
Figure 9:
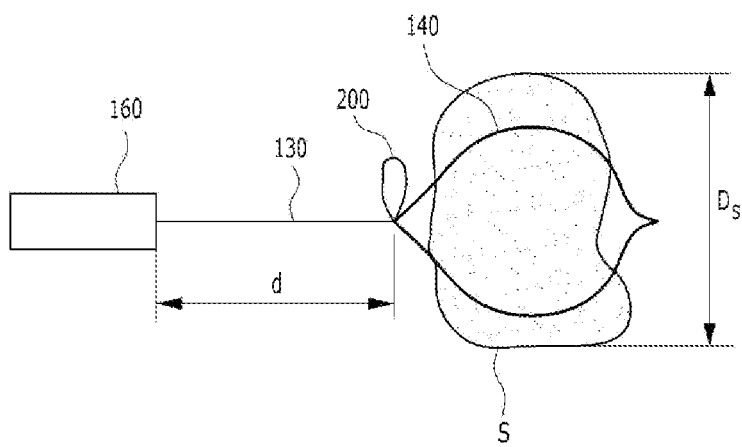
FIG. 9 is a mimetic diagram showing an arrangement of an imaging unit of a stone removing apparatus according to another preferred embodiment of the present invention and a stone.
Figure 10:
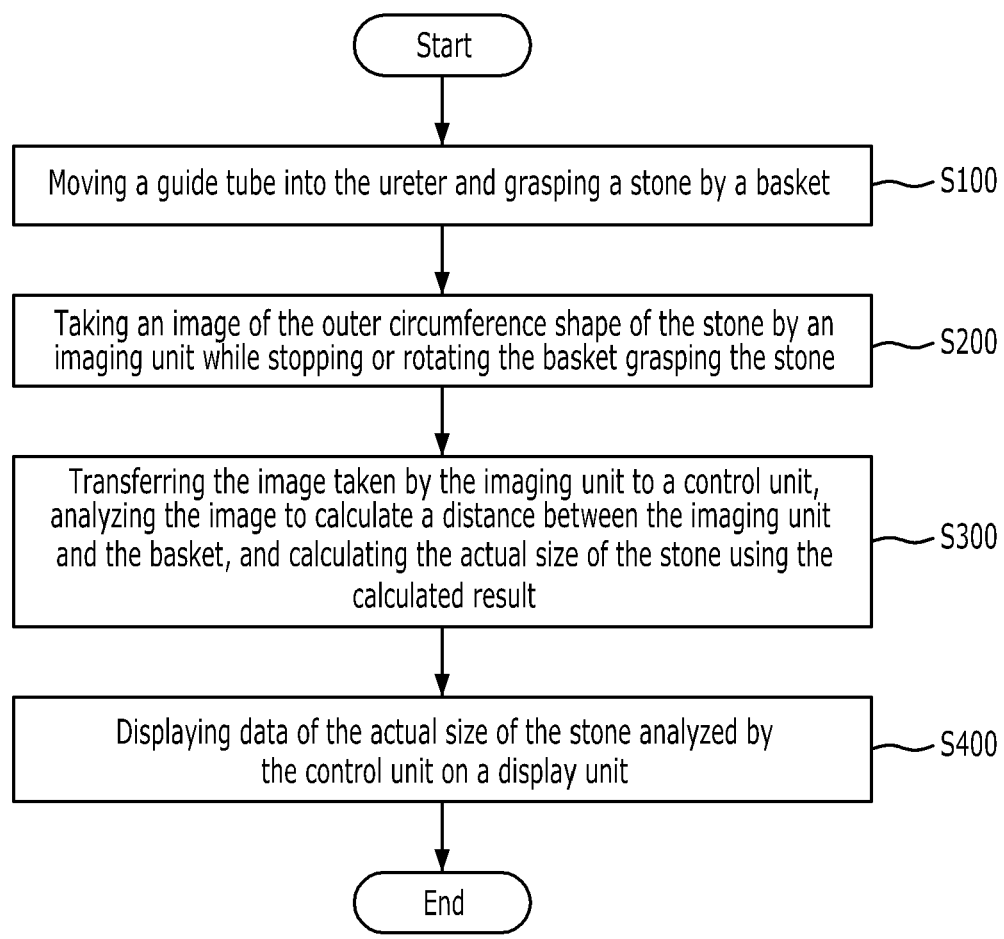
FIG. 10 is a flow chart showing a stone size measuring method according to the present invention.

FIG. 2 is a perspective view showing a stone removing apparatus according to a preferred embodiment of the present invention, FIG. 3 is a schematic diagram showing a state where the stone removing apparatus according to the preferred embodiment of the present invention removes a stone in a patient's body, FIG. 4 is a block diagram showing the stone removing apparatus according to the preferred embodiment of the present invention, FIG. 5 is a sectional view showing the stone removing apparatus according to the preferred embodiment of the present invention, FIG. 6 is an exemplary view showing an example of the stone removing apparatus according to the preferred embodiment of the present invention and illustrating an estimated size of a substantive stone based on an image taken by an imaging unit, FIG. 7 is a mimetic diagram showing an arrangement of the imaging unit of the stone removing apparatus and a stone, FIG. 8 is a graph to determine a size of an actual stone using the size of the stone on the image taken by the imaging unit of the stone removing apparatus of FIG. 7, FIG. 9 is a mimetic diagram showing an arrangement of an imaging unit of a stone removing apparatus according to another preferred embodiment of the present invention and a stone, and FIG. 10 is a flow chart showing a stone size measuring method according to the present invention.

As shown in FIGS. 2 to 8, the stone removing apparatus 100 according to the preferred embodiment of the present invention includes an insertion tube 110, a guide tube 120, a wire 130, a basket 140, an imaging unit 160, a control unit 170, a display unit 180, and a distance measuring unit 190.

As shown in FIG. 3, the stone removing apparatus 100 can measure a size of a stone (S) to discriminate the stone which is bigger than a ureter (U), and can measure the size of the stone (S) near an original position of the stone (S) without taking the stone (S) out of the kidney.

The insertion tube 110 is connected through the inside of a sheath 150, is movable relative to the sheath 150, and has an empty space therein.

The sheath 150 is mounted in the inner face of the ureter (U) to guide the insertion tube 110.

Furthermore, the sheath 150 protects the inner wall of the ureter (U) so that the insertion tube 110 and the guide tube 120 do not damage the inner wall of the ureter (U).

The insertion tube 110 may be, for instance, a part of an endoscope device, and an end portion of the insertion tube 110 is bent depending on the operation of the endoscope device and can move toward the place where the stone is located.

The guide tube 120 is inserted and moved into the inner space of the insertion tube 110.

Additionally, the guide tube 120 can guide the wire 130 and the basket 140 to the place where the stone (S) is located.

In addition, the guide tube 120 may be understood as a part of the endoscope device together with the insertion tube 110, and an end portion of the guide tube 120 is bent depending on the operation of the endoscope device and can move toward the place where the stone is located.

The wire 130 is inserted and moved into the guide tube 120.

Moreover, the wire 130 can move backwards relative to the guide tube 120 till the basket 140 is caught to the front of the guide tube 120 to move backwards no more.

The wire 130 is made in the form that an extremely thin spring steel wire is spirally wound on a core and a semicircular steel wire with flexibility and resilience is welded at ends thereof for safety.

Furthermore, the entire outer surface of the wire 130 is coated with Teflon so as to be smooth and to be prevented from being broken or bent in a blood vessel during inspection. Therefore, the wire does not damage the blood vessel.

Additionally, the wire 130 has a plurality of the wires 130, so that the stone removing apparatus 100 can be easily inserted into the human body through the plural wires 130, and can keep its fixed state at a desired position.

The basket 140 is disposed at the front of the wire 130 to grasp the stone (S).

The basket 140 can grasp the stone (S) while changing an expanded state and contracted state.

Moreover, the basket 140 is made of a material which is restored to its original shape when external power is not applied, for instance, made of shape memory alloy.

The imaging unit 160 is disposed at the front end of the guide tube 120 to take images of the stone (S) grasped by the basket 140.

Furthermore, the imaging unit 160 may be a subminiature endoscopic camera with high definition.

The imaging unit 160 can take images of the entire outward shape of the stone (S) while rotating the basket 140 grasping the stone (S).

That is, the imaging unit 160 can accurately take images of the size and the outward shape of the stone (S) while the basket 140 grasping the stone (S) is rotated.

The imaging unit 160 can take an image of the stone (S) at a time without rotation of the basket 140 if the entire shape of the stone (S) grasped by the basket 140 is understood at once.

Hereinafter, an actual stone size assumed on the basis of the image of the stone (S) taken by the imaging unit 160 will be described referring to FIG. 6.

As shown in FIG. 6, the control unit 170 corresponds the image to an X-Y coordinate part using the image of the stone (S) grasped by the basket 140.

That is, a distance from the center to a certain point of a contour is defined as r, and for instance, an angle θ is divided into 1° to 360° in order to calculate a value r per θ. The control unit 170 can divide the angle not by 1° but by various units.

A certain point P (X,Y) according to the outer circumference using the calculated r(θ) value can be calculated by the following formula.

$$P(X,Y)=P[r(\theta)\cos\theta, r(\theta)\sin\theta],\quad\text{(Mathematical formula 1)}$$

wherein the θ value is an angle in the counterclockwise direction on the basis of the X-axis. If a distance to a point ($P_{max}$) of the contour of the stone (S) which is the farthest from the center is defined as $\theta_{max}$, $$P\max(X\max, Y\max),$$

$$X\max=r(\theta\max)\cos(\theta\max)$$

$$Y\max=r(\theta\max)\sin(\theta\max)\quad\text{(Mathematical formula 2)}$$

Meanwhile, the coordinate of a certain point (P) of the contour of the stone (S) is $$X=r\cos\theta,\ Y=r\sin\theta\quad\text{(Mathematical formula)}$$

Moreover, a distance to the point ($P_{max}$) of the contour of the stone (S) which is the farthest from the center at the certain point (P) of the stone (S) is determined by the following mathematical formula.

$$d=\sqrt{(X-X\max)^2+(Y-Y\max)^2}\quad\text{(Mathematical formula 4)}$$

When the value d reaches the maximum value along the contour of the stone (S), the value becomes the size of the stone (S).

That is, as shown in FIG. 6 and the mathematical formula, in the state where the distance to the point $P_{max}(X_{max}, Y_{max})$ which is the farthest from the center of the stone (S) grasped by the basket 140 is set, the control unit 170 calculates a distance from the point $P_{max}(X_{max}, Y_{max})$ to the farthest point P(X, Y) along the contour of the stone (S), and the calculated distance becomes the maximum size of the stone (S). The maximum size is a size (Ds) of the stone displayed on a screen.

In order to calculate an actual stone size (Dr) using the stone size (Ds) displayed on the screen taken by the imaging unit 160, as shown in FIG. 7, a distance D between the imaging unit 160 and the basket 140 grasping the stone (S) must be checked.

As shown in FIG. 5, the value d is determined by measurement of the distance measuring unit 190 that measures a distance between the distance measuring unit 190 and the rear end of the guide tube 120 when the stone (S) is grasped to the basket 140 and the wire 130 positioned in the guide tube 120 is pulled no more after being pulled back.

That is, if the distance between the distance measuring unit 190 and the rear end of the guide tube 120 becomes long, the value d is decreased, and vice versa.

Therefore, the total length of the wire 130 is fixed according to used devices, and if the sum of the length of the guide tube 120 and the distance between the distance measuring unit 190 and the rear end of the guide tube 120 is deducted, the value d is calculated. When the distance between the distance measuring unit 190 and the rear end of the guide tube 120 is measured, the distance d between the imaging unit 160 and the basket 140 grasping the stone (S) can be obtained.

In the meantime, the graph of FIG. 8 can be obtained from lots of data obtained by measuring stone sizes (Ds) of images corresponding to a variety of actual stone sizes (Dr) according to used devices. That is, FIG. 8 is a mimetic diagram showing relationship between the stone size (Ds) on the screen obtained through various tests using this apparatus and the actual stone size (Dr).

Such a graph may be stored and used as an empirical formula or data by the control unit 170.

As shown in FIG. 8, in case that the distance (d) between the imaging unit 160 and the center of the basket 140 is set, if the stone size (Ds) on the screen is known, the actual stone size (Dr) can be obtained through the graph.

That is, if the actual stone (S) is found using the apparatus of the present invention and is grasped by the basket 140, in the state where the wire 130 is pulled as much as possible, the distance between the distance measuring unit 190 and the end of the guide tube 120 is measured in order to calculate the value d. the calculated value d and the stone size (Ds) of the image taken by the used apparatus are calculated. Therefore, the actual stone size (Dr) can be calculated using the graph of FIG. 8.

Meanwhile, as another preferred embodiment of the present invention which measures the distance (d) between the imaging unit 160 and the basket 140 grasping the stone (S), an auxiliary imaging object 200 may be used. In this embodiment, as shown in FIG. 9, the auxiliary imaging object 200 having a predetermined size is attached to the front surface of the basket 140.

Moreover, when the basket 140 grasps the stone (S), the imaging unit 160 takes an image of the auxiliary imaging object 200, the image of the imaging unit 160 is transferred to the control unit 170, and the control unit 170 measures the size of the stone displayed on the screen of the auxiliary imaging object 200.

After the stone (S) is grasped by the basket 140, when the wire 130 is pulled back, the imaging unit 160 and the auxiliary imaging object 200 take images of different sizes due to the distance between the imaging unit 160 and the auxiliary imaging object 200.

That is, if the distance between the imaging unit 160 and the auxiliary imaging object 200 becomes long, the size displayed on the screen of the auxiliary imaging object 200 is taken to be small, and vice versa.

Therefore, if a camera of the imaging unit 160 is determined, through a pretest, a size value of the stone of the image taken by the auxiliary imaging object 200 according to a change in the value d is measured, a database of relationship between the imaging unit and the auxiliary imaging object or an empirical formula is made so that the control unit 170 can use the database or the empirical formula. In this instance, the control unit can calculate the distance d between the imaging unit 160 and the basket 140 according to the size displayed on the screen of the auxiliary imaging object 200 using the database or the empirical formula.

Additionally, the size value (Ds) of the stone displayed on FIG. 9 can be easily deduced using the value d. As shown in FIG. 8, in case that the distance (d) between the imaging unit 160 and the center of the basket 140 is set, if the stone size on the screen is known, the actual stone size can be obtained through the graph. Such all processes are determined and calculated by the control unit 170.

As described above, the process of calculating the actual size of the stone (S) grasped by the basket 140 using the distance (d) between the imaging unit 160 and the stone and the stone size (Ds) displayed on the screen.

Hereinafter, as shown in FIG. 4, the structure of the stone removing apparatus according to the present invention will be described. First, the control unit 170 is electrically connected with the imaging unit 160 to analyze the image taken by the imaging unit 160 and to measure the size of the stone (S).

The display unit 180 is linked to the control unit 170 by wire or wirelessly in order to display the contents analyzed by the control unit 170.

The distance measuring unit 190 is mounted at the rear end portion of the wire 130, namely, at the opposite side of the basket 140 in order to measure a relative movement distance between the imaging unit 160 and the wire 130 relative to the guide tube 120.

Furthermore, the distance measuring unit 190 may be an infrared sensor or a displacement sensor.

Additionally, the distance measuring unit 190 is electrically connected with the control unit 170 in order to transfer displacement information of the wire 130 to the control unit 170.

As shown in FIG. 10, a stone size measuring method according to a preferred embodiment of the present invention includes the step of moving the guide tube 120 into the ureter (U) and grasping the stone (S) by the basket 140.

Moreover, in a state where the basket 140 grasping the stone (S) is rotated or fixed, the imaging unit 160 takes an image of the outer circumferential shape of the stone (S) (S200).

Furthermore, the control unit 170 receives the image taken by the imaging unit 160, analyzes the image, calculates the distance between the imaging unit 160 and the basket 140, and calculates the size of the actual stone (S) using the calculated distance (S300).

The data of the actual size of the stone (S) analyzed by the control unit 170 is displayed on the display unit 180 so that the doctor can find out (S400).

Based on the image, the point on the contour of the stone (S) which is the farthest from the center is set, and the actual size of the stone (S) is calculated using the distance to the outer point which is the farthest from the point.

If the stone (S) displayed on the display unit 180 is smaller than the outer diameter of the sheath 150, the stone (S) is directly removed. If the stone (S) is bigger than the outer diameter of the sheath 150, the stone (S) is crushed by a crusher, and then, the stone (S) smaller than the outer diameter of the sheath 150 is grasped by the basket 140 and is removed.

The operational state according to the stone removing apparatus and the stone size measuring method according to the present invention will be described as follows.

The wire 130 inserted into the guide tube 120 is moved to the location of the stone (S), and the basket 140 is expanded by receiving the stone (S).

Additionally, when the basket 140 grasps the stone (S), the imaging unit 160 takes an image of the stone (S), and in this instance, the imaging unit 160 takes an image of a state of the stone (S) in a state where the basket 140 grasping the stone (S) is fixed or rotated.

As described above, according to the outer shape of the stone (S) taken by the imaging unit 160, the control unit 170 calculates the distance between the point $P_{max}$ which is the farthest from the center of the stone (S) and the outer point which is the farthest from the point $P_{max}$ in order to grasp the maximum size of the stone (S).

In addition, based on the image taken by the imaging unit 160, the control unit 170 measures the diameter (D) of the stone (S) on the image and the distance (d) between the imaging unit 160 and the stone (S) to determine the size (Dr) of the stone (S).

Therefore, the present invention can let the doctor know the size of the stone (S) in real time through the steps of taking an image of the stone (S) taken by the imaging unit 160 and grasped by the basket 140, transferring the image to the control unit 170, measuring the shape and the size of the stone (S), sending the measured result to the display unit 180 so that the doctor can find out the size of the stone (S) in real time.

The imaging unit 160 accurately takes images of the size and the shape of the stone (S), and the control unit 170 calculates the size of the actual stone. If the stone (S) is smaller than the outer diameter of the sheath 150, the stone (S) is directly removed. If the stone (S) is bigger than the outer diameter of the sheath 150, the stone (S) is crushed by a crusher, and then, the stone (S) which is smaller than the outer diameter of the sheath 150 is grasped by the basket 140 to be removed.

As described above, while the present invention has been particularly shown and described with reference to the example embodiments thereof, it will be understood by those of ordinary skill in the art that various changes, modifications and equivalents may be made in the present invention without departing from the technical scope and idea of the present invention. Therefore, it would be understood that the present invention is not limited by the changes, modifications and equivalents but is limited by the following claims.

What is claimed is:

1. A stone removing apparatus comprising:
    an insertion tube having an inner space;
    a guide tube inserted into the inner space of the insertion tube and movable along the insertion tube;
    a wire inserted into an inner space of the guide tube and movable along the guide tube;
    a basket disposed at a front of the wire and configured to grasp a stone;
    an image capture disposed at a front end of the guide tube and configured to take an image of the stone grasped by the basket;
    a controller electrically connected to the image capture and configured to analyze the image taken by the imaging capture; and
    wherein an end portion of the insertion tube is capable of being bent so that the insertion tube is movable toward the stone to be removed,
    wherein an end portion of the guide tube is capable of being bent so that the guide tube is movable toward the stone to be removed, and
    wherein the controller is further configured to determine a first distance between the image capture and the basket, set a point of an outer circumference of the stone, the point being farthest from a center based on the image, and determine a second distance between the point and an outer contour point which is positioned on an outer counter of the image and farthest from the point, and determine an actual size of the stone using the first distance and the second distance.

2. The stone removing apparatus according to claim 1, further comprising:
    a display linked with the controller by wire or wirelessly to display contents analyzed by the controller, wherein the contents include data of the actual size of the stone.

3. The stone removing apparatus according to claim 1, wherein the image capture is further configured to take an image of the outer circumference of the stone in a state where the basket grasping the stone is fixed or rotated.

4. The stone removing apparatus according to claim 1, further comprising:
    a sheath surrounding an outside of the insertion tube so that the insertion tube moves inside the sheath with respect to the sheath.

5. The stone removing apparatus according to claim 1, wherein image capture is further configured to take the image of the stone grasped by the basket, and the controller is further configured to measure the first distance between the image capture and a center of the basket grasping the stone in order to determine the actual size of the stone.

6. The stone removing apparatus according to claim 1, further comprising:
    distance measure mounted at a rear end portion of the wire and configured to measure a relative movement distance between the image capture and the wire.

7. The stone removing apparatus according to claim 6, wherein the first distance between the image capture and the basket is determined based on a third distance and the third distance from the rear end portion of the wire to a rear end of the guide tube is measured by the distance measure based on the relative movement distance.

8. The stone removing apparatus according to claim 1, further comprising an auxiliary image attached to a front surface of the basket grasping the stone, wherein the image capture takes an image of the auxiliary image and the controller is configured to determine the first distance between the image capture and the basket using a size of the stone displayed on the image of the auxiliary image.

9. The stone removing apparatus according to claim 1, wherein the wire includes a spring steel wire spirally wound on a core and a semicircular steel wire with flexibility and resilience is welded at ends thereof.

10. The stone removing apparatus according to claim 1, wherein the wire comprises a plurality of wires.

11. The stone removing apparatus according to claim 1, wherein the basket is made of a material which is restored to an original shape thereof when external power is not applied to the basket.

12. A stone removing apparatus comprising:
an insertion tube having an inner space;
a guide tube inserted into the inner space of the insertion tube and movable along the insertion tube;
a wire inserted into an inner space of the guide tube and movable along the guide tube;
a basket disposed at a front of the wire and configured to grasp a stone;
an image capture disposed at a front end of the guide tube and configured to take an image of the stone grasped by the basket;
a controller configured to be electrically connected with the image capture and analyze the image taken by the imaging capture,
wherein the controller is configured to calculate a first distance between the image capture and the basket and measure an actual size of the stone using the calculated first distance, and
wherein the wire is made in a form that a spring steel wire is spirally wound on a core and a semicircular steel wire with flexibility and resilience is welded at ends thereof.

13. The stone removing apparatus according to claim 12, further comprising:
a display linked with the controller by wire or wirelessly to display contents analyzed by the controller, wherein the contents include data of the actual size of the stone.

14. The stone removing apparatus according to claim 12, wherein the image capture is further configured to take the image of the stone grasped by the basket, and
wherein the controller is further configured to:
measure the first distance between the image capture and a center of the basket grasping the stone,
set a point of an outer circumference of the stone, the point being farthest from a center based on the image;
determine a second distance between the point and an outer contour point which is positioned on an outer counter of the image and farthest from the point; and
determine the actual size of the stone using the first distance and the second distance.

15. The stone removing apparatus according to claim 12, further comprising:
distance measure mounted at a rear end portion of the wire and configured to measure a relative movement distance between the image capture and the wire.

16. The stone removing apparatus according to claim 15, wherein the first distance between the image capture and the basket is determined based on a third distance and the third distance from the rear end portion of the wire to a rear end of the guide tube is measured by the distance measure based on the relative movement distance.

17. The stone removing apparatus according to claim 12, further comprising an auxiliary image attached to a front surface of the basket grasping the stone, wherein the image capture takes an image of the auxiliary image and the controller is configured to determine the first distance between the image capture and the basket using a size of the stone displayed on the image of the auxiliary image.

18. A stone size measuring method comprising the steps of:
mounting an insertion tube in an inner surface of an object:
moving a guide tube through an inside of the insertion tube into the object and grasping a stone by a basket;
taking an image of an outer circumference of the stone using an image capture while stopping or rotating the basket grasping the stone;
transferring, by the image capture, the image taken by the image capture to a controller electrically connected to the image capture;
determining, by the controller, a first distance between the image capture and the basket;
setting, by the controller, a point of an outer circumference of the stone, the point being farthest from a center based on the image, and determining a second distance between the point and an outer contour point which is positioned on an outer counter of the image and farthest from the point, and determining an actual size of the stone using the first distance and the second distance; and
displaying data of the actual size of the stone on a display.

19. The stone size measuring method according to claim 18, further comprising the steps of:
mounting a sheath in an inner surface of the object: and
connecting the insertion tube through an inside of the sheath.

* * * * *